United States Patent
Gordon et al.

(10) Patent No.: US 10,438,500 B2
(45) Date of Patent: Oct. 8, 2019

(54) JOB PROFILE INTEGRATION INTO TALENT MANAGEMENT SYSTEMS

(71) Applicant: Pearson Education, Inc., New York, NY (US)

(72) Inventors: Margo Erin Gordon, Menlo Park, CA (US); Alexander W. Lowrie, Davis, CA (US); Michael John Mayor, London (GB); Lindsay Noelle Oishi, Sunnyvale, CA (US); Joseph John Worachek, Littleton, CO (US)

(73) Assignee: Pearson Education, Inc., Bloomington, MN (US)

( * ) Notice: Subject to any disclaimer, the term of this patent is extended or adjusted under 35 U.S.C. 154(b) by 547 days.

(21) Appl. No.: 15/069,539

(22) Filed: Mar. 14, 2016

(65) Prior Publication Data

US 2017/0263150 A1    Sep. 14, 2017

(51) Int. Cl.
*G09B 5/06* (2006.01)

(52) U.S. Cl.
CPC ..................................... *G09B 5/06* (2013.01)

(58) Field of Classification Search
CPC . G09B 7/00; G09B 7/02; G09B 19/00; G06Q 10/0639; G06Q 50/20
See application file for complete search history.

(56) References Cited

U.S. PATENT DOCUMENTS

| 8,175,511 | B1 | 5/2012 | Sordo et al. |
|---|---|---|---|
| 2001/0044795 | A1 | 11/2001 | Cohen et al. |
| 2002/0016814 | A1 | 2/2002 | Convent et al. |
| 2002/0091702 | A1 | 7/2002 | Mullins |
| 2003/0037034 | A1 | 2/2003 | Daniels et al. |
| 2003/0039948 | A1 | 2/2003 | Donahue |
| 2003/0074370 | A1 | 4/2003 | Gargano et al. |
| 2005/0055357 | A1 | 3/2005 | Campbell |
| 2005/0277103 | A1 | 12/2005 | Townshend et al. |
| 2007/0231780 | A1 | 10/2007 | Shulman |
| 2011/0039249 | A1 | 2/2011 | Packard et al. |
| 2012/0214147 | A1 | 8/2012 | Ernst et al. |
| 2012/0231439 | A1 | 9/2012 | Attali |
| 2012/0276505 | A1 | 11/2012 | Al Badrashiny et al. |
| 2014/0164507 | A1 | 6/2014 | Tesch et al. |
| 2014/0295384 | A1 | 10/2014 | Nielson et al. |
| 2014/0335497 | A1 | 11/2014 | Gal et al. |
| 2014/0335502 | A1 | 11/2014 | Huang et al. |
| 2015/0325138 | A1 | 11/2015 | Selinger |
| 2016/0225278 | A1 | 8/2016 | Leddy |
| 2016/0293036 | A1 | 10/2016 | Niemi et al. |

*Primary Examiner* — Jerry-Daryl Fletcher
(74) *Attorney, Agent, or Firm* — Quarles and Brady LLP

(57) ABSTRACT

Systems, device configurations, and processes for integrating a job profile describing an occupation into a talent management system (TMS) by determining proficiency requirements from job profile data are used to develop validated scores for competency in one or more job skills. The resulting integrated job profiles may be included as a component of TMS job offerings related to the occupation. The systems and methods evaluate parameters of the job profile using a predetermined scoring framework. Particular implementations evaluate English language proficiency in one or more frameworks. A job profile describes the occupation in the form of tasks to be completed by an employee. The systems and methods associate the tasks with scoring parameters in the framework, and calculate an overall score for English proficiency from the collection of scores associated with the tasks.

20 Claims, 11 Drawing Sheets

JOB PROFILE INTEGRATION INTO TALENT MANAGEMENT SYSTEMS

BACKGROUND

A company's talent management system (TMS) is an electronic platform that the company uses to recruit, develop, and evaluate employees. In one aspect, the TMS maintains job descriptions for positions within the company. Job descriptions can include parameters such as the job title, the situation within the corporate hierarchy, a general description of the job, and a list of tasks that a person holding the job would be expected to perform. Job descriptions can be largely standardized, and companies are motivated to adopt standard or common ways of describing positions so that the TMS can inteface with external occupational data stores. In a particular example, the United States Bureau of Labor and Statistics provides the O*Net database of occupational information to companies and job-seekers alike. Using O*Net data structures, a TMS can access thousands of job profiles that have already been created; the company can expand its pool of available talent to include job seekers that describe themselves according to O*Net parameters, either directly or through a talent placement company or similar service.

Global companies increasingly view English language skill as a core competency for their employees. However, most recruiters, functional managers, and HR team members do not have the expertise or tools needed to objectively evaluate their employees' English skills. Companies can benefit from a better understanding of the specific English skills required to perform a particular job and the current skill level of those who seek to do that job. It would be advantageous for a TMS to provide a consistent and precise method for understanding and assessing English language skills, both for evaluating particular employees and candidates, and for more particularly specifying job requirements in a job description.

BRIEF DESCRIPTION OF DRAWINGS

The detailed description is set forth with reference to the accompanying drawings. The use of the same reference numbers in different figures indicates similar or identical items or features. Various embodiments in accordance with the present disclosure will be described with reference to the drawings, in which.

DETAILED DESCRIPTION

Figure 1:
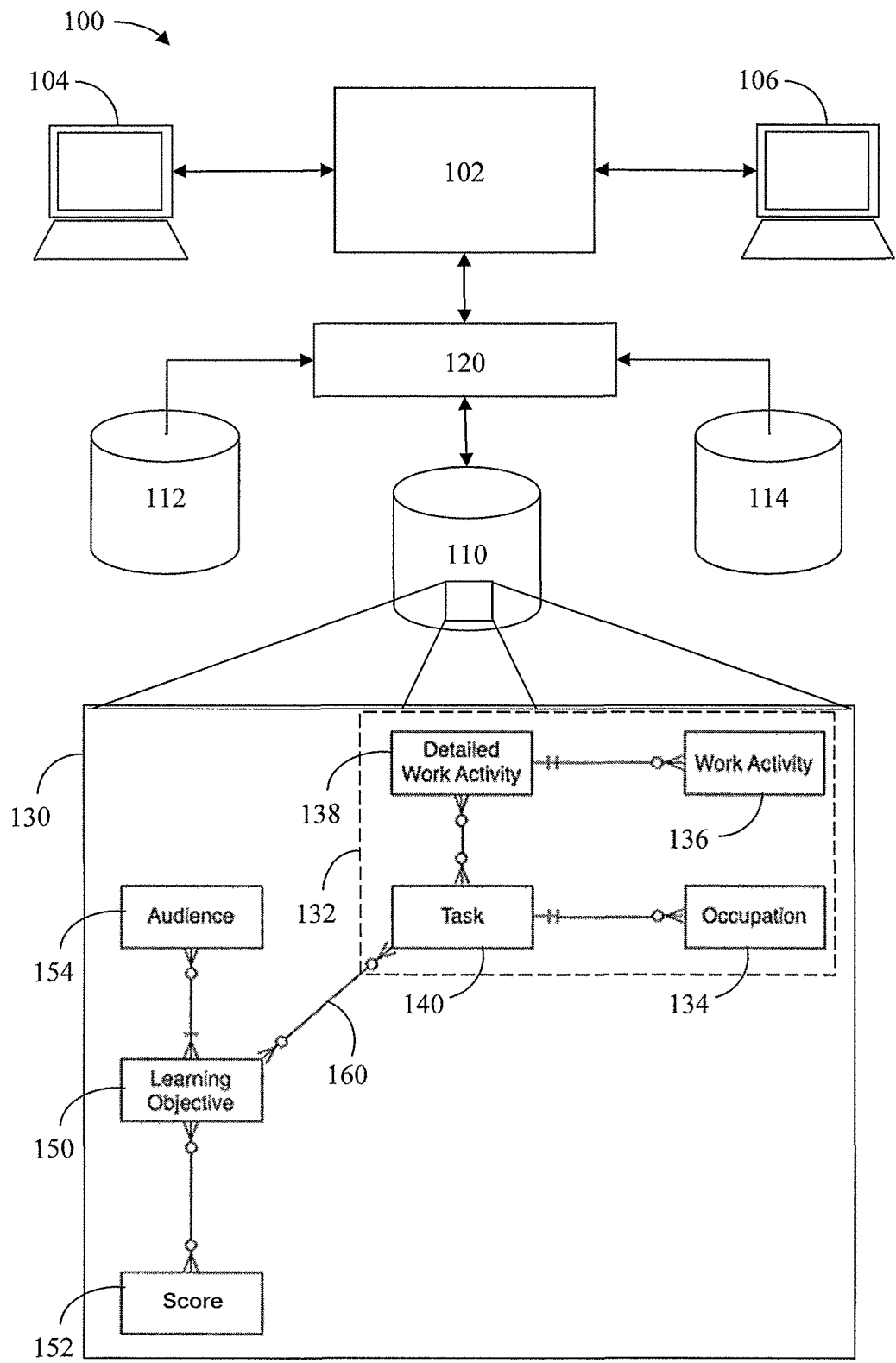
FIG. 1 is a diagram of an example system configured to provide integrated job profiles to a talent management system, in accordance with the present disclosure.

The present disclosure provides systems, device configurations, and processes for integrating a job profile describing an occupation into a talent management system (TMS) by determining proficiency requirements from job profile data and developing validated scores for competency in one or more job skills, to be included as a component of TMS job offerings related to the occupation. The systems and methods may evaluate parameters of the job profile using a predetermined scoring framework. The exemplary embodiments are described with respect to evaluation of English language proficiency, but it will be understood that the systems and methods may be used to evaluate other job skills using a relevant scoring framework, as desired.

In one embodiment, the disclosure provides a system that includes: a first data store comprising a plurality of learning objectives belonging to a framework for measuring English proficiency, each of the learning objectives being associated with a corresponding score; a second data store containing data used by a talent management system (TMS) of a company; and a server communicatively coupled to and configured to access the first data store and the second data store. The server includes device logic and a processor that executes the device logic to integrate job profiles into the second data store via the following actions: receive job profile data representing a job profile describing an occupation, the job profile data including a plurality of tasks that an individual holding the occupation must be able to complete; generate an integrated job profile data structure representing the job profile integrated with the framework; identify one or more of the plurality of learning objectives in the first data store as being required to complete one or more of the plurality of tasks; associate, in the integrated job profile data structure, the one or more learning objectives with each of the plurality of tasks that requires the corresponding learning objective; calculate an overall score from at least the associated scores of the one or more learning objectives; store the overall score in the integrated job profile data structure; and store the integrated job profile data structure in the second data store.

The processor may further execute the device logic to connect to a user device over a computer network, send to the user device a user interface including a first task of the plurality of tasks and a first learning objective of the plurality of learning objectives, the user device displaying the user interface to a user, receive from the user device a user input comprising a selection of the first learning objective, and associate the first learning objective with the first task. The processor may further execute the device logic to: receive training data representing a plurality of pre-integrated job profiles, the training data comprising a plurality of integrated tasks each associated with one or more of the plurality of learning objectives; determine that a first task of the plurality of tasks is similar to one or more similar tasks of the plurality of integrated tasks; determine that one or more of the one or more similar tasks is associated with a first learning objective of the plurality of learning objectives; and associate the first learning objective with the first task.

The processor may further execute the device logic to analyze the job profile data to obtain a plurality of keywords, identify at least one first keyword of the plurality of keywords as being obtained from a first task of the plurality of tasks, determine that a first learning objective of the plurality of learning objectives is associated with the at least one first keyword, and associate the first learning objective with the first task. The processor may further execute the device logic to identify the occupation from the job profile data, obtain one or more employee records each associated with an employee that held the occupation, determine an English proficiency score of each employee from the corresponding employee record of the one or more employee records, and calculate the overall score from the English proficiency score of each employee associated with one of the one or more employee records.

In another embodiment, the disclosure provides a computing device in electronic communication with a first data store. The computing device has device logic and a processor that executes the device logic to: receive job profile data representing a job profile describing an occupation, the job profile data including a plurality of tasks that an individual holding the occupation must be able to complete; generate an integrated job profile data structure representing the job profile integrated with a framework for measuring English proficiency, the framework having a scale of scores; determine that a first plurality of the scores is associated with the occupation; calculate an overall score from at least the first plurality of scores; store the overall score in the integrated job profile data structure; and store the integrated job profile data structure in the first data store.

The computing device may be communicatively coupled to and configured to access a plurality of data stores including the first data store, at least one of the plurality of data stores storing a plurality of learning objectives belonging to the framework, each of the learning objectives being associated with a corresponding score in the scale. To determine that the first plurality of scores is associated with the occupation, the processor may execute the device logic to identify a first learning objective of the plurality of learning objectives as being required to complete a first task of the plurality of tasks, and associate, in the integrated job profile data structure, the first learning objective with each of the plurality of tasks that requires the corresponding learning objective.

Alternatively, to determine that the first plurality of scores is associated with the occupation, the processor may further execute the device logic to: connect to a user device over a computer network; send, to the user device, a user interface including a first task of the plurality of tasks and a plurality of learning objectives belonging to the framework, the user device displaying the user interface to a user; receive from the user device a user input comprising a selection of the plurality of learning objectives; and determine that the first plurality of scores is associated with the plurality of learning objectives. Or, to determine that the first plurality of scores is associated with the occupation, the processor further executes the device logic to: receive training data representing a plurality of pre-integrated job profiles, the training data comprising a plurality of integrated tasks each associated with a corresponding plurality of learning objectives belonging to the framework; determine that a first task of the plurality of tasks is similar to a second task of the plurality of integrated tasks; determine that the second task is associated with a first plurality of the learning objectives; and determine that the first plurality of scores is associated with the first plurality of learning objectives. Or, to determine that the first plurality of scores is associated with the occupation, the processor may further execute the device logic to: analyze the job profile data to obtain a plurality of keywords; identify at least one first keyword of the plurality of keywords as being obtained from a first task of the plurality of tasks; determine that a plurality of learning objectives belonging to the framework is associated with the at least one first keyword; and determine that the first plurality of scores is associated with the plurality of learning objectives.

Alternatively, to determine that the first plurality of scores is associated with the occupation, the processor further executes the device logic to: identify the occupation from the job profile data; obtain one or more employee records each associated with an employee that held the occupation; determine an English proficiency score of each employee from the corresponding employee record of the one or more employee records; and determine that the first plurality of scores includes the determined English proficiency scores.

In another embodiment, the disclosure provides a computer-implemented method for integrating a job profile describing an occupation into an electronic talent management system (TMS). The method includes: receiving, from an electronic data store, job profile data representing the job profile, the job profile data including a plurality of tasks that an individual holding the occupation must be able to complete; generating an integrated job profile data structure representing a first integrated job profile of a plurality of integrated job profiles, wherein the first integrated job profile is the job profile integrated with a framework for measuring English proficiency; determining that a first task of the plurality of tasks requires the individual to fulfill a first learning objective of a plurality of learning objectives each having an associated score that measures English proficiency; associating the first task with the first learning objective in the integrated job profile data structure; determining that a second task of the plurality of tasks requires the individual to fulfill a second learning objective of the plurality of learning objectives; associating the second task with the second learning objective in the integrated job profile data structure; calculating an overall score from at least the associated scores of the first and second learning objectives; storing the overall score in the integrated job profile data structure; and storing the integrated job profile data structure in a data store of the TMS. The job profile data may further include an occupation parameter identifying the occupation, and the method may further comprise storing the job profile data in the integrated job profile data structure.

The method may further include connecting to a user device over a computer network, and determining that the first task requires the individual to fulfill the first learning objective may include sending a user interface including the first task and the first learning objective to the user device, the user device displaying the user interface to a user, and receiving from the user device a user input comprising a selection of the first learning objective. The method may further include receiving training data representing one or more of the plurality of integrated job profiles, the training data comprising a plurality of integrated tasks each associated with one or more of the plurality of learning objectives; determining that the first task requires the individual to fulfill the first learning objective may thus include determining that the first task is similar to one or more similar tasks of the plurality of integrated tasks and determining that one or more of the one or more similar tasks is associated with the first learning objective.

The method may further include analyzing the job profile data to obtain a plurality of keywords; thus, determining that the first task requires the individual to fulfill the first learning objective may include identifying at least one first keyword of the plurality of keywords as being obtained from the first task and determining that the first learning objective is associated with the at least one first keyword. Determining that the first learning objective is associated with the at least one first keyword may include: identifying a term associated with the first learning objective, the term selected from an ontology; and determining that at least one of the at least one first keyword is associated with the term. The method may further include identifying the occupation from the job profile data, obtaining one or more employee records each associated with an employee that held the occupation, and determining an English proficiency score of each employee from the corresponding employee record of the one or more employee records, wherein the overall score is further calculated from the English proficiency score of each employee associated with one of the one or more employee records. Calculating the overall score from the English proficiency score of each employee associated with one of the one or more employee records may include using the corresponding English proficiency score to validate the overall score calculated from the corresponding scores of at least the first learning objective and the second learning objective.

The evaluation or assessment of job profile data in order to develop and validate scores for the job profile and its associated parameters, described below, may be performed using any suitable scoring methodology or combination of methodologies that is applicable to the job skill(s) being evaluated. English proficiency scoring methodologies include the Common European Framework of Reference for Languages (CEFR), the Pearson Test of English ("PTE Academic"), the International English Language Testing System (IELTS), and the Test of English as a Foreign Language (TOEFL®). In one example, described in detail herein, the systems and methods may apply the Global Scale of English (GSE) scoring methodology. The GSE is a standardised, granular scale from 10 to 90, which measures English language proficiency in each of four functional skills: listening, reading, speaking and writing. The GSE is psychometrically aligned with the CEFR. Unlike other frameworks, which describe attainment in wide bands, the GSE identifies what a learner can do in a more granular way at each point (i.e., integer value) on the scale. It is therefore possible to much more precisely show whether a learner—or a learning objective, as described below—is situated toward the top or bottom, or somewhere in the middle, of a comparatively wide-banded level (e.g., the six wide levels of the CEFR).

The CEFR and the GSE each include a framework of learning objectives with which the scores on the scale are associated. The CEFR model describes the development of proficiency as quantitative (i.e., how many tasks someone can perform) and qualitative (i.e., how well they perform them). Hence, the quantitative dimension is expressed in terms of communicative activities, while the qualitative dimension is expressed in terms of communicative competencies. The CEFR also models and scales communicative strategies, viewed as the link between communicative competencies and communicative activities. According to a user's knowledge and abilities, he or she will employ different strategies when performing a given activity. Each CEFR learning objective is described in terms of the competency it tests, and is associated with one of the six levels of the scale.

The GSE framework extends, and fills gaps in, the framework of the CEFR and modifies the way in which the learning objectives are presented. Descriptors for GSE learning objectives relate to functional activities (i.e., specific language tasks) rather than competencies. In particular, the descriptors are typically composed of three consecutive elements: performance, describing the language function itself (e.g., "Can answer the telephone [in English]"); criteria, describing the intrinsic quality of the performance, typically in terms of the range of language used (e.g., "using a limited range of basic vocabulary"); and conditions, describing any extrinsic constraints on the performance (e.g., "with visual support," or "if spoken slowly and clearly"). In order to create a set of learning objectives that can support a more granular scale of measurement, the same task frequently occurs at multiple levels of quality; the quality indicators are included in the learning objective itself (i.e., via the criteria). Sociolinguistic and pragmatic competencies are also included in the wording of the learning objectives themselves, rather than being presented as a separate set.

In the GSE, each integer value, or "score," on the scale is associated with one or more learning objectives in each of the four functional skills. Generally, someone who can perform the learning objectives for one of the functional skills has achieved the associated score in that functional skill; the overall GSE score is an average or weighted average of the highest scores achieved in the four functional skills. That said, language learning is not necessarily sequential, and a learner might be strong in one area, where he has had a lot of practice or a particular need or motivation, but quite weak in another. For that reason, to say that a learner is 'at' a certain level on the Global Scale of English does not mean he has necessarily mastered every GSE learning objective for every skill up to that point. Neither does it mean that he has failed to master any learning objective at a higher GSE score. If an individual is assessed as being at 61 on the scale, it means s/he has a 50% probability of being able to perform learning objectives at that level, a greater probability of being able to perform learning objectives at a lower level, and a lower probability of being able to perform learning objectives at a higher level.

Implementations described in detail herein operate upon data structured into a job profile, and generate and display user interfaces for enabling users to interact with an electronic system, such as a TMS, and create, modify, locate, access, retrieve, and perform other actions upon job profiles that describe occupations requiring certain competencies in the English language. Referring to FIG. 1, a computing system 100 in accordance with the present disclosure includes a primary-executing computing device, such as a server 102 having a processor that executes device logic within the processor or contained in memory of the server 102. The server 102 may be a server computer or a system of interconnected server computers, such as a web server, application server, application platform, virtual server, cloud data server, and the like, a personal computer, laptop computer, tablet computer, e-reader, smartphone, personal data assistant, set-top box, digital media player, microconsole, home automation system, or similar computing device having a central processing unit (CPU), microprocessor, or other suitable processor. It should be understood that there could be several cooperating servers 102 of homogenous or varying types, layers or other elements, processes or components, which may be chained or otherwise configured, which can interact to perform tasks such as obtaining data from an appropriate data store that is accessible locally to the cooperating server 102 or remotely over the network. The server 102 can include any appropriate hardware, software and firmware for integrating with the data store as needed to execute aspects of one or more applications for the client device, handling some or all of the data access and business logic for an application. The server 102 may provide access control services and is able to generate content including text, graphics, audio, video and/or other content usable to be provided to the user, which may be served to requesting devices 104, 106 in any suitable format, including HyperText Markup Language (HTML), Extensible Markup Language ("XML"), JavaScript (including JavaScript Object Notation ("JSON")), Cascading Style Sheets (CSS), or another appropriate client-side structured language. Content transferred to a requesting device 104, 106 may be processed by the requesting device 104, 106 to provide the content in one or more forms including forms that are perceptible to the user audibly, visually and/or through other senses including touch, taste, and/or smell.

The handling of all requests and responses, as well as the delivery of content between a requesting device 104, 106 and the server 102, can be handled by the server 102, such as a web server using an appropriate server-side structured language in this example. It should be understood that operations described as being performed by a single device may, unless otherwise clear from context, be performed collectively by multiple devices, which may form a distributed and/or virtual system. Additionally, the server 102 or another computing device can make the content available to other devices and in other services; this includes distributing the content in any form, such as the integrated job profiles created using the methods herein, as well as non-integrated job profile data, learning objective data, and other data used by or available to the server 102. In some embodiments, the application programming interface (API) 120 described below or another API (e.g., a representational state transfer ("REST") API) may be configured to enable or facilitate access to the content by another computing device or system.

The server 102 typically will include an operating system that provides executable device logic for the general administration and operation of that server 102 and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure. The environment, in one embodiment, is a distributed and/or virtual computing environment utilizing several computer systems and components that are interconnected via communication links, using one or more computer networks or direct connections.

The device logic configures the processor, and thus the server 102, to perform the processes described herein. In some embodiments, the server 102 may be a web server remote from other devices of the system 100 and communicating with such devices over the internet or another suitable electronic network or combination of networks. The server 102 may implement all or a portion of a TMS operated by a company; the portion of the TMS operated by the server 102 may include hardware and/or software modules that implement the job profile integration and/or user interface generation techniques described herein.

The server 102 may be in communication, such as via an appropriate electronic communication network, with a TMS terminal 104 in control of the company operating the TMS. The TMS terminal 104 may be any suitable computing device, such as a desktop or tablet computer, smartphone or other mobile device, and the like. Communications between the server 102 and the TMS terminal 104 may be encrypted; a user of the TMS terminal 104 may be required to provide authentication credentials to use the TMS terminal 104. The server 102 may be remote from the TMS terminal 104 as described above, or the server 102 and the TMS terminal 104 may be the same computing device or discrete computing devices physically connected to each other. In some embodiments, the server 102 may be a TMS server operating the entirety of the TMS, and a plurality of TMS terminals 104 may access the server 102 to perform talent management functions related to recruiting, training, human resources, administration, and the like. In some embodiments, the server 102 may be operated by a party other than the company, such as when the TMS is implemented using third-party service provider software.

A network, as used herein, can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network can be enabled by wired or wireless connections and combinations thereof.

The server 102 may also be in communication with a visitor terminal 106 via any suitable communication network. The visitor terminal 106 may be any suitable computing device, such as a desktop or tablet computer, smartphone or other mobile device, and the like. The visitor terminal may access public or semi-private functionality of the TMS via the server 102. In an example described further below, a job seeker may use the visitor terminal 106 to search for job profiles managed by the server 102.

The server 102 may include or be in communication, via an electronic network, with one or more TMS data stores 110. Generally as used herein, a data store may be any repository of information that is or can be made freely or securely accessible by the server 102. Suitable data stores include, without limitation: databases or database systems, which may be a local database, online database, desktop database, server-side database, relational database, hierarchical database, network database, object database, object-relational database, associative database, concept-oriented database, entity-attribute-value database, multi-dimensional database, semi-structured database, star schema database, XML or JSON data object database, file, collection of files, spreadsheet, or other means of data storage located on a computer, client, server, or any other storage device known in the art or developed in the future; file systems; and electronic files such as web pages, spreadsheets, and documents. Each of the data stores may be temporary or permanently implemented. In one embodiment, the server 102 may access a TMS data store 110 using an application programming interface (API) 120.

A TMS data store 110 may include information used in any TMS operation. The TMS data store 110 can include several separate data tables, databases, data documents, dynamic data storage schemes and/or other data storage mechanisms and media for storing data relating to a particular aspect of the present disclosure, including without limitation the data structures and user interface data described herein. It should be understood that there can be many aspects that may need to be stored in the TMS data store 110, such as user information and access rights information, which can be stored in any appropriate mechanisms in the TMS data store 110. The TMS data store 110 may be operable, through logic associated therewith, to receive instructions from the server 102 and obtain, update, or otherwise process data in response thereto. The server 102 may provide static, dynamic or a combination of static and dynamic data in response to the received instructions. Dynamic data, such as data used in web logs (blogs), web or mobile applications and application interfaces, news services and other applications may be generated by server-side structured languages as described or may be provided by TMS or another content management system ("CMS") operating on, or under the control of, the server 102.

As illustrated, a TMS data store 110 may include a plurality of integrated job profiles 130 created in accordance with the present disclosure. An integrated job profile 130 may be a database record or set of records, a file, a data stream, or another suitable stored data structure that includes a job profile 132 and one or more learning objectives 150 associated therewith. The integrated job profile 130 may include a score 152 (e.g., a GSE score) or another value serving as a quality indicator, and may further include an audience 154, associated with each learning objective 150.

A job profile 132 may be a data structure that is unique to the system 100, or may be one that is partially or fully standardized as described above. The job profile 132 may be stored in a job profile data store 112, which may be a component of the system 100 or may be a data source situated externally to the system 100. In one embodiment, the job profile 132 may conform to the data structure for job profiles provided by O*NET Online, a service of the United States Bureau of Labor and Statistics. Advantageously, this arrangement allows for job profiles 132 stored in the TMS data store 110 to be populated with data from job profiles in the O*NET database (which is an example of a job profile data store 112). The job profile 132 may include all or a subset of the parameters in a standardized data structure. In the illustrated exemplary embodiment, which may facilitate interoperability with certain job profile databases, the job profile 132 includes at least the following parameters: occupation 134, which identifies an occupation and may be a job title, job category, job type, or other suitable descriptor (e.g., "accountant"; one or more work activities 136, which are descriptors of abstract or generalized job functions used across may different occupations (e.g., "gathering information," or "analyzing data"); one or more detailed work activities 138 each associated with one of the work activities 136 and providing more detail with respect to the associated work activity 136 (e.g., for a work activity 136 of "analyzing data" in the occupation 134 "biologist," a detailed work activity 138 may be "analyzing biological samples"); and one or more tasks 140, each of which a person with the occupation 134 is expected to accomplish, and each of which may be related to a detailed work activity 138, such as by being a condition precedent to accomplishing the detailed work activity 138.

Where the job profile 132 is external to the system, the server 102 may directly, or through the API 120, retrieve or receive the job profile 132 from the job profile data store 112. The server 102 integrates the job profile 132 with the present TMS that tracks English proficiency requirements, by associating one or more (e.g., two to three) learning objectives 150 with the job profile 132, such as by establishing relationships 160 of learning objectives 150 with each of the tasks 140. As described above, the learning objectives 150 (e.g., in the CEFR and GSE frameworks) each demonstrate a certain English proficiency. The learning objectives 150 and associated data (e.g., score 152) may be obtained from a learning objectives data store 114, which may be a component of the system 100 or may be a data source situated externally to the system 100. Generally, the system 100 is used to identify one or more learning objectives 150 as related to (e.g., needed to perform) a task 140; when this relationship 160 is defined, the job profile 132 data, the data for (or data references to) the associated learning objectives 150, and the relational framework are stored in the TMS data store 110 as a data record for an integrated job profile 130, using any of the methods described below. The learning objectives 150 may be obtained from a scoring methodology, such as the GSE, and therefore each may have a score 152 (e.g., on a scale of 10 to 90 for GSE) associated therewith. Furthermore, each learning objective 150 may identify an audience 154 to which it pertains. For example, the GSE framework of learning objectives is divided into four audiences: young learners, adult learners, academic english learners, and professional-use english learners.

Figure 2:
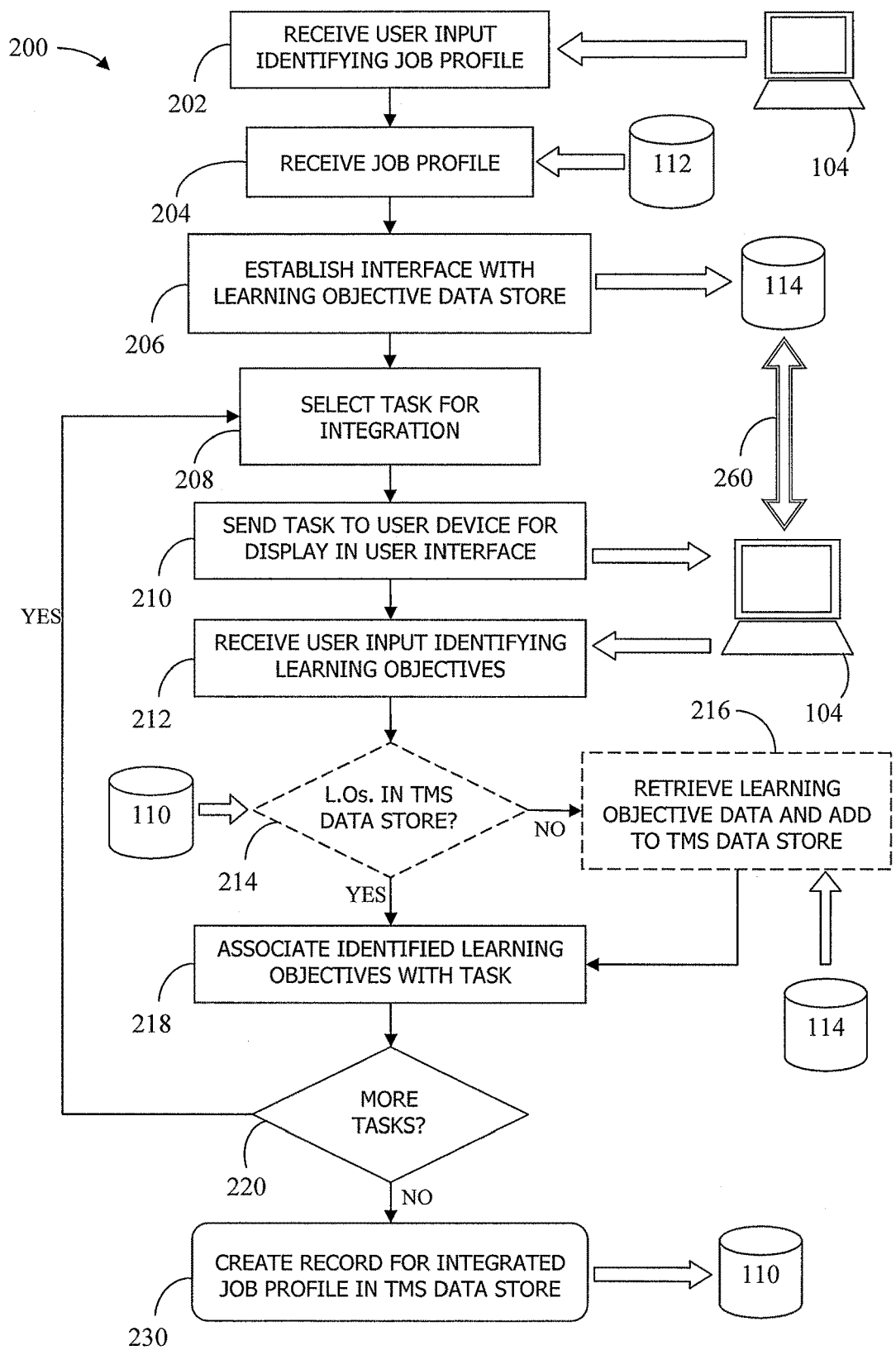
FIG. 2 is a flowchart of an example method of integrating a job profile using user input.

FIG. 2 illustrates a method 200 by which the server 102 may integrate a job profile according to user input. The user providing the user input may be using the TMS terminal 104 or another suitable input device having a connection to the server 102. The server 102 may provide a user interface to the TMS terminal 104, which the TMS terminal 104 then displays to the user. The user interface may enable the user to view data sent to the TMS terminal 104 by the server 102, and to enter user input that the TMS terminal 104 transmits to the server 102, according to the method 200. At step 202, the server 102 may receive user input identifying a job profile to be integrated into the TMS. The user may enter data, such as a job title, or may select the job profile in a display (e.g., in the user interface), to generate the user input.

At step 204, the server 102 may receive the identified job profile, such as by querying the job profile data store 112 using the user input. All or a portion of the data for a job profile may be received. In some embodiments, the job profile includes a plurality of tasks as described above, and the server 102 may receive a representative set of the tasks, rather than all of the tasks (although all of the tasks may be received). In an exemplary embodiment, an externally stored job profile (e.g., one provided by O*NET Online) includes a plurality of "core" job tasks, and an importance score representing how important the core job task is to the performance of occupational duties is assigned to each core job task; the server 102 may receive only a certain number (e.g., ten) of the core job tasks having the highest importance scores. Furthermore for this example, some or all of the core job tasks may have supplementary tasks, and the server 102 may ignore the supplementary tasks.

In some embodiments, such as when the server 102 does not locally store a database of learning objectives (e.g., in a TMS data store 110), the server 102 may, directly or through the API 120, access a remote learning objectives data store 114. However, the server 102 may not be configured, or may have insufficient information, to retrieve the relevant learning objectives. Additionally, a learning objectives data store 114 may have a large amount of content that is infeasible to be wholly retrieved by the server, particularly when the entire database is not needed. For example, the GSE framework at present includes over 1500 learning objectives, and only a fraction of them may be relevant to the job profile. Therefore, at step 206 the server 102 may establish a communication interface 260 with the learning objectives data store 114 for the benefit of the TMS terminal 104. That is, the server 102 may connect the TMS terminal 104 to the learning objectives data store 114 using any suitable channels, protocols, and interfaces, so that the user can use the TMS terminal 104 to search the learning objectives data store 114 and identify the relevant learning objectives. In some embodiments, the interface 260 may create a direct connection, such as by sending to the TMS terminal 104 an internet address for the learning objectives data store 114 or an API therefor. In other embodiments, the interface 260 may indirectly connect the TMS terminal 104, such as by receiving queries and commands from the user via the user interface on the TMS terminal 104 and sending the queries and commands to the learning objectives data store 114, then reversing the data flow to deliver results to the user.

At step 208, the server 102 may select a task of the job profile that has not yet been processed by the integration method 200. At step 210, the server 102 may send the selected task to the user device (e.g., TMS terminal 104) for display in the user interface. At that point, the communication interface 260 negotiates the user's search for and identification of learning objectives that are needed and/or are preferred to be met by an employee in order to accomplish the task. In embodiments where the learning objectives are in the GSE framework, the server 102 may direct the user to identify at least one learning objective in each of the four functional skill categories (listening, reading, speaking, writing). In some embodiments, the server 102 may direct the user to identify a plurality of learning objectives having different scores. For example, the user may be directed to select learning objectives that are minimally necessary, learning objectives that the company wishes to see achieved in a qualified candidate, and learning objectives that an excellent candidate is able to achieve; these three selections produce three different scores that may be used to calculate the low, average, and high scores (e.g., GSE scores) for the integrated job profile.

At step 212, the server 102 receives user input identifying the selected learning objectives. The server 102 may receive each selection by the user as it is made, or may receive all of the selections at once when the user has finished identifying the learning objectives. In some embodiments, the server 102 may optionally determine whether each identified learning objective is present in the TMS data store 110, at step 214. This may be performed in implementations where the TMS data store 110 is configured to contain associated data for each learning objective. If the check (step 214) is performed, and the learning objective is not in the TMS data store 110, the server 102 may, at step 216, retrieve all or a desired subset of the learning objective data from the learning objective data store 114 and add the learning objective and its associated data to the TMS data store 110.

At step 218, the server 102 may associate each of the identified learning objectives with the selected task. In one embodiment, this association is performed by retrieving the learning objective, the associated score(s), and any other desired data elements associated with the learning objective, from the learning objective data store 114, and adding the retrieved data elements to a data structure representing the integrated job profile. In adding the retrieved data, the server 102 may maintain any relational information between data elements, and may further create the relationship between the learning objective and the task. In another embodiment, the association is performed by adding a reference to the learning objective's physical location in a data store, which may be the TMS data store 110 or the learning objective data store 114. Advantageously, the data records for the integrated job profiles are smaller in this embodiment because they do not contain the learning objective data itself, avoiding repetitious storage of such data.

At step 220, the server 102 may determine if there are any more tasks in the job profile that have not been processed using the integration method 200. If there are more tasks, the server 102 returns to step 208 to continue the integration. If all tasks have been processed, at step 230 the server 102 may create a data record for the integrated job profile in the TMS data store 110. In some embodiments, the server 102 may simply write the data structure generated through step 220 to memory. In other embodiments, the server 102 may perform further processing at this step, such as collecting keywords for the learning objectives to be used in other processing methods (see below) and storing the keywords in the data structure. At this step 230, the server 102 may compute additional scores using the raw scores associated with the selected learning objectives.

In an exemplary embodiment using GSE scores, the server 102 may calculate: the average score in each of the four functional skill categories; from the raw scores or the functional skill average scores, an overall GSE score for the occupation; from the ranges of raw scores, the low and high scores in each function skill category; and, from the raw scores or the low and high functional skill scores, the low and high overall GSE scores. The server 102 may further calculate the standard deviation of any of the calculated average scores. The standard deviation, in some embodiments, may represent the range of scores that indicate a minimum required English proficiency; that is, a person scoring below the range determined from the standard deviation could be expected to face significant challenges performing the English language tasks of the associated occupation. Any of the calculated scores may be stored in the data record for the integrated job profile.

Other processing at step 230 may include categorizing the integrated job profile and/or associating the integrated job profile with related integrated job profiles in the TMS data store 110. In embodiments where the non-integrated job profile was obtained from a job profile data store 112, the job profile may already contain data for categorizing or associating the integrated job profile. For example, the O*NET database maintains occupation categories (e.g., "finance") and stores the category of an occupation as a field in the occupation's job profile; the integrated job profile may retain the category field. Other examples of associating the integrated job profile are described below.

Figure 3:
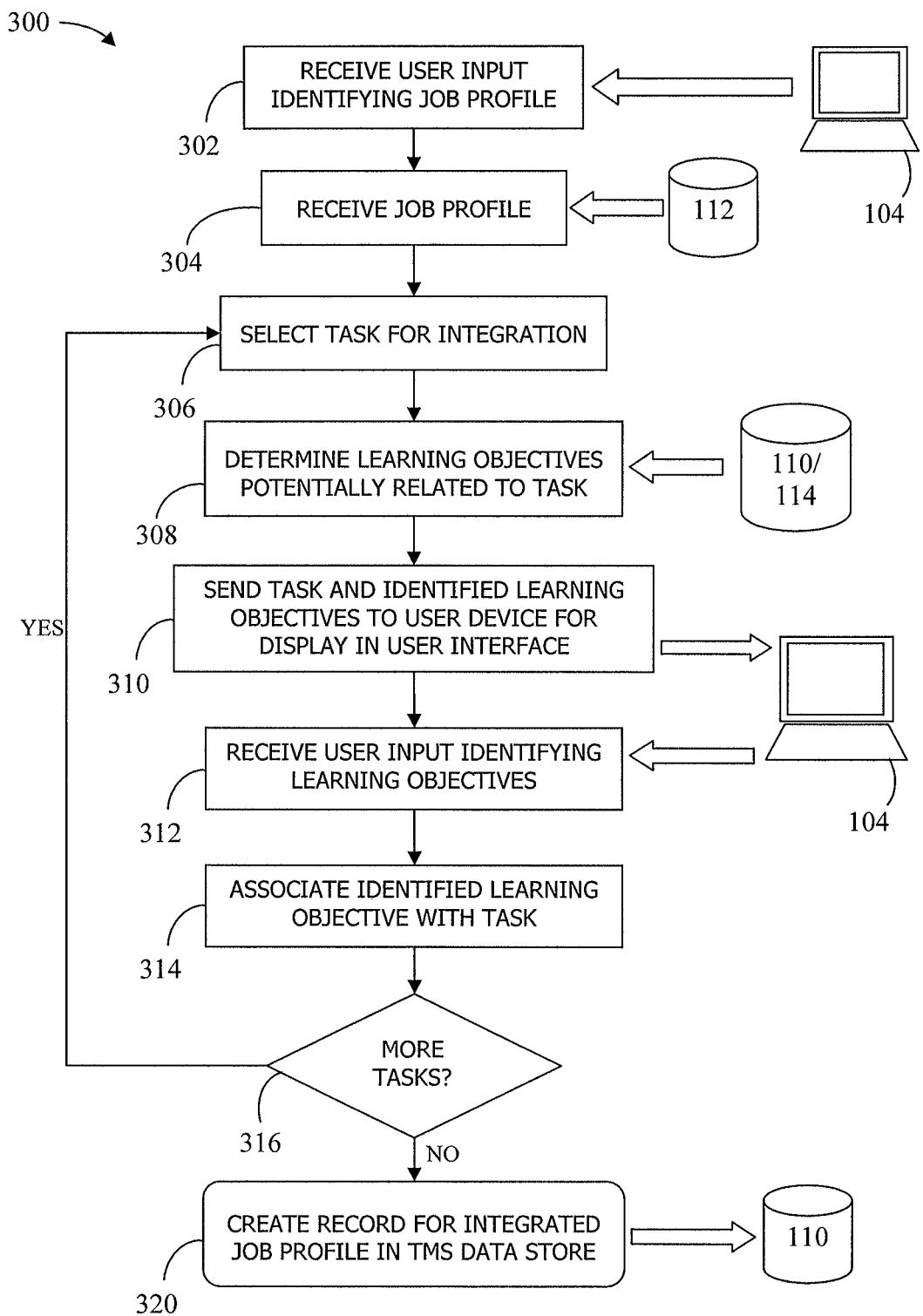
FIG. 3 is a flowchart of another example method of integrating a job profile using user input.

Referring to FIG. 3, another integration method 300 that is directed by user input begins with the steps of receiving the identification of a job profile (step 302), receiving the job profile (step 304), and selecting a task for integration (step 306), which are described above with respect to steps 202-206 of FIG. 2. At step 308, the server 102 may use the data associated with the selected task or the job profile to identify a set of learning objectives that are potentially related to the task. In one example, the server 102 may determine that the category of the job profile is identical, similar, synonymous with, or related to one or more categories of learning objectives, and may determine the learning objectives of the category(ies) to be potentially related to the task. At step 310, the server 102 may send the task and one, some, or all of the identified learning objectives to the TMS terminal 104 to be presented in the user interface. At step 312, the server 102 may receive user input identifying the learning objectives selected by the user. The server 102 may then associate the learning objectives with the task (step 314), check for additional un-integrated tasks (step 316), and then create the data record for the integrated job profile (step 320) as described above with respect to steps 218-230 of FIG. 2.

Figure 4:
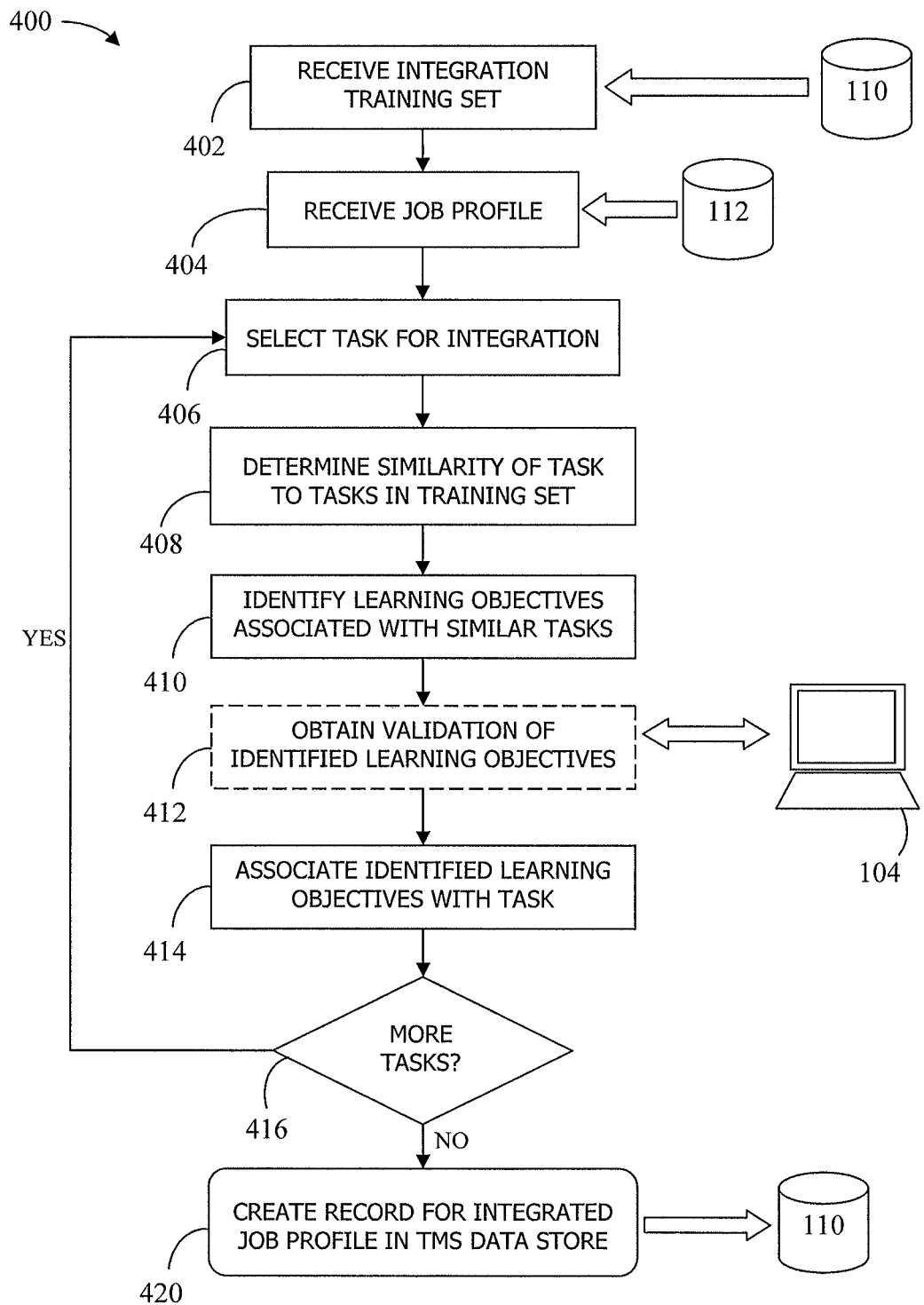
FIG. 4 is a flowchart of an example method of integrating a job profile using machine learning algorithms.

FIG. 4 illustrates a method 400 in which the server 102 applies machine learning algorithms to integrate a job profile. At step 402, the server 102 may receive a training set of integrated job profiles. The training set may include a number of profiles that have already been integrated using one or more of the methods described herein (e.g., by user-directed integration according to the method 200 of FIG. 2). Thus, the training set represents a plurality of learning objectives that are already linked to job profiles and can be identified as relevant to a category, a work activity, a task, or any other data element of a job profile. The training set may further include additional data related to the previous integration processing of the members of the set. For example, the training set may track user validation data received from a user device (e.g., in step 412 of the present method 400); such user validation data may indicate data elements of learning objectives that were misidentified as relevant, or that were not identified as relevant and should have been. The training set may be general, or may be specific to a particular category or other suitable data element. The training set may be stored in the TMS data store 110 as a list or table of references to the profiles of the training set, or the training set may contain complete copies of the integrated job profiles that belong to it.

At step 404, the server 102 may receive a job profile, and at step 406 the server 102 may select a task for integration, as described above with respect to steps 202 and 208, respectively, of FIG. 2. At step 408, the server 102 may compare data elements of the task to data elements of one or more of the tasks in the training set to determine a similarity of the selected task to the pre-integrated tasks. In one embodiment, the server 102 may use any suitable text comparison technique to determine a degree to which the selected task and the pre-integrated task contain the same words. In another embodiment, the server 102 may apply term frequency calculations to the training set to determine keywords that appear with high frequency in the tasks, and the server 102 may determine whether the description of the selected task contains any of the keywords. A predetermined threshold similarity may be used to retain the most similar tasks.

At step 410, the server 102 may identify the learning objectives that are associated with the similar tasks. At step 412, the server 102 optionally may validate the identified learning objectives by communicating them to one or more user devices, such as the TMS terminal 104, and receiving back confirmation that satisfaction of the identified learning objectives is needed and/or desired to accomplish the task. The user input received from the user devices may cause the server 102 to remove or add learning objectives, in some embodiments. The server 102 may then associate the learning objectives with the task (step 414), check for more tasks to be integrated (step 416), and create the data record for the newly integrated job profile (step 420), as described above with respect to steps 218-230 of FIG. 2. Additionally, at step 420 the server 102 may add the newly created integrated job profile to the training set, and/or may otherwise update the training set with user validation data and/or other data obtained during the integration process 400.

Figure 5:
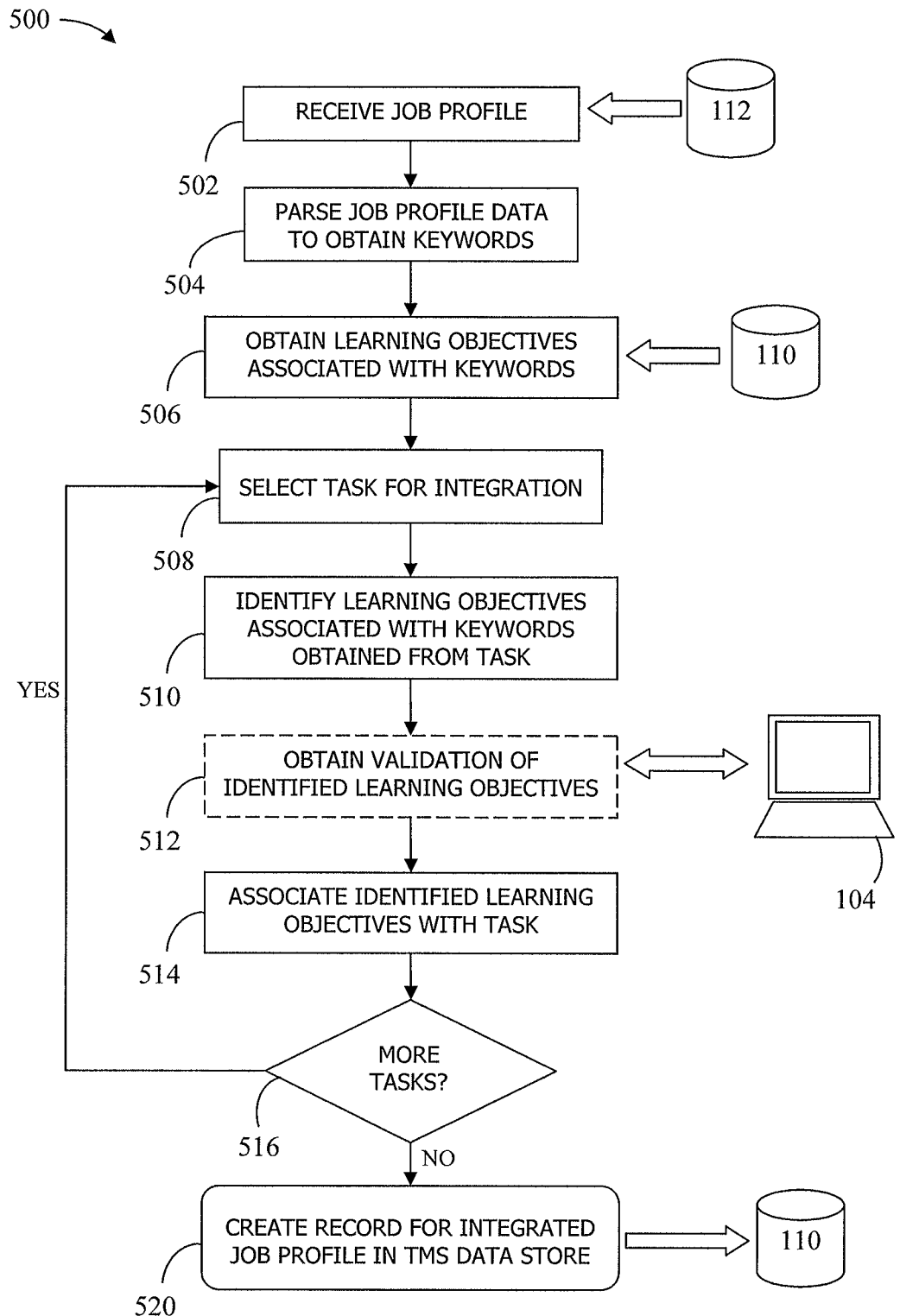
FIG. 5 is a flowchart of an example method of integrating a job profile using keywords.

FIG. 5 illustrates another method 500 of integrating job profiles, in which the server 102 automatically identifies learning objectives that are relevant to a task using keyword comparison. At step 502, the server 102 receives a job profile as described above with respect to step 202 of FIG. 2. At step 504, the server 102 may parse the job profile data to obtain a plurality of keywords. Any suitable technique or combination of techniques for term extraction may be used to identify descriptive words in the job profile data as keywords, and any or all of the data elements (e.g., occupation, job description, category, work activities, tasks, etc.) may be analyzed to extract the keywords. The server 102 may use a suitable database of words and phrases, including standard dictionaries, keyword dictionaries, occupational glossaries, and the like, which may be generated and/or stored in the TMS data store 110 or another internal or external data store. The server 102 may further use the word databases, such as a thesaurus, to determine synonyms of the identified keywords, and may identify the synonyms as keywords as well. If the server maintains a keyword dictionary, the identified keywords may be added thereto. In some embodiments, the server 102 may track which keywords are identified from each of the tasks, for use in step 510 described below.

At step 506, the server 102 may obtain some or all of the learning objectives associated with some or all of the keywords identified from the job profile data. This step 506 presumes an existing data store in which the available learning objectives have been associated with keywords. An external data store such as the learning objective data store 114 may store the learning objectives in this manner, and the server 102 may query the learning objective data store 114 using the keywords. In addition, or alternatively, the present system may maintain its own such data store within the TMS data store 110 or another internal data store. Learning objectives may be stored in a data structure with associated keywords, or with terms that are ontologically related to other words in an index, dictionary, or other suitable ontology that facilitates keyword searching of the learning objectives in the data store.

At step 508, the server 102 selects one of the tasks. At step 510 the server 102 identifies, from the learning objectives obtained at step 506, the learning objectives that are associated with keywords identified from the particular task. The server 102 may use its own data generated to track the source of the identified keywords, in order to delineate those that are relevant to the task. If the source was not tracked, the server 102 may perform any suitable text comparison to determine the keywords that are relevant to the task. The server 102 then validates the identified learning objectives (step 512), associates the learning objectives with the task (step 514), checks for additional tasks to integrate (step 516), and creates a data record for the integrated job profile (step 520), as described above with respect to steps 412-420 of FIG. 4. In some embodiments, at step 520 the server 102 may further update the association of the selected learning objectives with keywords of the associated tasks.

Figure 6:
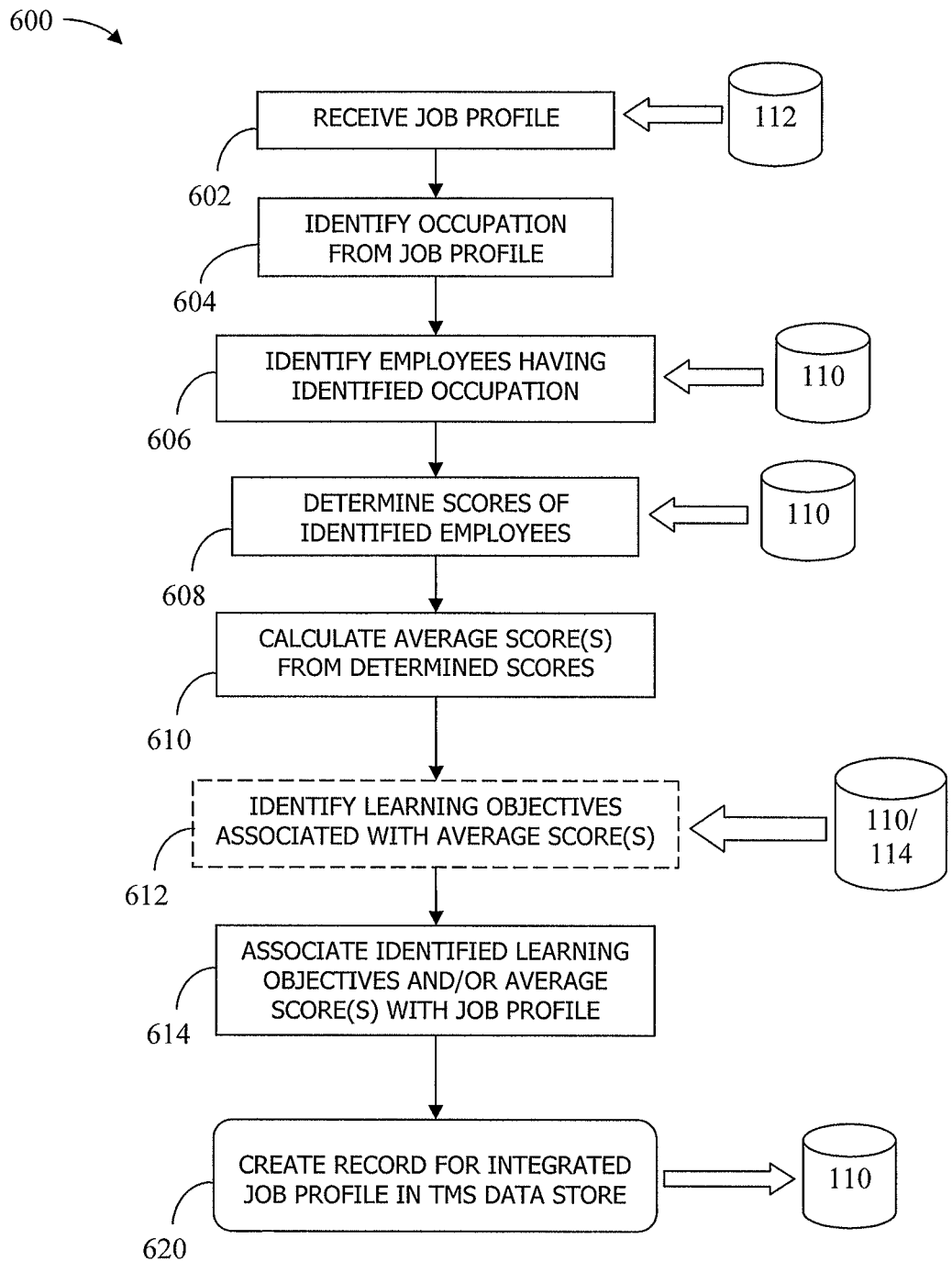
FIG. 6 is a flowchart of an example method of integrating a job profile using employee data.

FIG. 6 illustrates yet another integration method 600. Rather than building the English proficiency integration up through analysis of tasks, in the exemplary method 600 the server 102 determines proficiency scores for an occupation using the scores of employees who hold or have held the occupation. At step 602, the server 102 receives a job profile to be integrated. At step 604, the server 102 identifies the occupation of the job profile. At step 606, the server 102 may query its own TMS data store 110, and any other suitable internal or external data store, to identify one or more employees (or former employees, or contractors, or other individuals, collectively referred to as "employees") that currently hold or previously held the identified occupation.

At step 608, the server 102 may determine the English proficiency scores of the identified employees. This presumes that the company scores its employees (e.g., at hiring or in periodic evaluations), and that the TMS data store 110 or another internal data store retains the scores. In embodiments using the GSE framework, the server 102 may collect the overall GSE score and/or one or more of the functional skill scores. At step 610, the server 102 may calculate one or more averages or weighted averages of the collected GSE scores, using any suitable methodology. These scores are the scores for the occupation, and thus for the integrated job profile, and may include an overall score, sub-scores for particular categories, and score ranges, in accordance with the scores of the representative employees. For the GSE framework, the scores may include one or more of an overall GSE score, GSE scores for the functional skills, and high and/or low limit scores for the overall and the functional skill categories.

At step 612, the server 102 may optionally identify one or more learning objectives that are associated with the scores produced in step 610. For example, in the GSE framework a subset of the learning objectives produce a particular integer score; this subset can be further limited to those learning objectives belonging to a particular functional skill category and/or directed at a particular audience. The server 102 may keep all of the learning objectives in one of the subsets, or may further determine those that are relevant to the occupation. For example, the server 102 may use the keyword comparison techniques described above, or another suitable text comparison technique, to determine the learning objectives that have the desired score and are relevant to the occupation. At step 614, the server 102 may associate the identified learning objectives with the job profile. Additionally or alternatively, the server 102 may associate the calculated score(s) with the job profile, creating an integrated job profile. Finally, at step 620 the server 102 may create the data record for the integrated job profile in the TMS data store 110 as described above.

The described methods are exemplary and may be combined and/or modified to improve the accuracy, efficiency, computing resource overhead, or other aspect of the integration process. In some embodiments, for example, the method 600 of FIG. 6 for identifying scores for an occupation using existing employee data may be applied to validate scores obtained using one or more of the other described methods. Thus, the present systems may be evaluated to determine whether the job profile integration methods are producing reliable scores by comparing the produced scores to scores of actual employees. Table 1 demonstrates an exemplary result of any of the integration processes, whereby tasks common to several analytical occupations are assigned learning objectives from the GSE framework; the corresponding GSE score and functional skill category of each learning objective is also listed. The results may be understood with reference to an exemplary job description: "Conduct organizational studies and evaluations, design systems and procedures, conduct work simplification and measurement studies, and prepare operations and procedures manuals to assist management in operating more efficiently and effectively; includes program analysts and management consultants."

TABLE I

Learning Objectives and Tasks in Example Integrated Job Profile

| Learning Objective | Skill | GSE Score | Task | Importance |
|---|---|---|---|---|
| Can write a report explaining in detail a work-related problem, the actions taken, and the results of those actions. | Writing | 71 | Gather and organize information on problems or procedures. | 70 |
| Can scan a long text or a set of related texts in order to find specific information. | Reading | 63 | | |
| Can interpret the main message from complex diagrams and visual information. | Reading | 62 | Analyze data gathered and develop solutions or alternative methods of proceeding. | 70 |
| Can understand the main information in technical work-related documents. | Reading | 53 | | |
| Can use persuasive language to convince others to agree with their recommended course of action during a discussion. | Speaking | 74 | Confer with personnel concerned to ensure successful functioning of newly implemented systems or procedures. | 69 |
| Can take part in routine formal discussions conducted in clear standard speech in which factual information is exchanged. | Speaking | 60 | | |
| Can participate in extended, detailed professional discussions and meetings with confidence. | Speaking | 80 | Review forms and reports and confer with management and users about format, distribution, and purpose, and to identify problems and improvements. | 65 |
| Can understand complex technical work-related documents in detail. | Reading | 79 | | |
| Can carry out an effective, fluent interview, spontaneously following up on interesting replies. | Speaking | 72 | Interview personnel and conduct on-site observation to ascertain unit functions, work performed, and methods, equipment, and personnel used. | 65 |
| Can write a detailed report of work-related events. | Writing | 69 | | |
| Can link a logical series of ideas leading to a suggested conclusion in a written report. | Writing | 68 | Document findings of study and prepare recommendations for implementation of new systems, procedures, or organizational changes. | 65 |
| Can carry out a prepared interview, checking and confirming information as necessary. | Speaking | 57 | | |
| Can describe in detail a change in the way a business is run. | Speaking | 70 | Prepare manuals and train workers in use of new forms, reports, procedures or equipment, according to | 63 |
| Can present information related to the business in a formal discussion. | Speaking | 68 | | |

TABLE I-continued

Learning Objectives and Tasks in Example Integrated Job Profile

| Learning Objective | Skill | GSE Score | Task | Importance |
|---|---|---|---|---|
| | | | organizational policy. | |
| Can write a report describing business plans and strategies in detail. | Writing | 76 | Plan study of work problems and procedures, such as organizational change, communications, information flow, integrated production methods, inventory control, or cost analysis. | 61 |
| Can describe in detail how a change will help the company, its employees, or its customers. | Speaking | 70 | | |
| Can write a detailed structured report on work-related topics. | Writing | 70 | Design, evaluate, recommend, and approve changes of forms and reports. | 61 |
| Can write a plan of action detailing a problem, how it will be fixed, and when. | Writing | 67 | | |

Any suitable number of job profiles may be integrated into the TMS using the systems and methods of assessing necessary English language competencies for the associated occupation and associating learning objectives and scores with the tasks of the job profile. In one example, the present system may integrate the entire O*NET database of job profiles, creating an integrated job profile for each occupation in the O*NET database. In another example, the TMS of a company may include only job profiles that are relevant to the company's operations. The system may be configured to add, modify, and remove integrated job profiles, and may retrieve and format the integrated job profiles for display in a user interface, or for use in other data processing tasks. Several types of users of the system may access the TMS database to retrieve or perform other operations on one or more integrated job profiles. Exemplary uses of an integrated job profile by different types of users are illustrated in FIGS. 7-11 and are now described.

Figure 7:
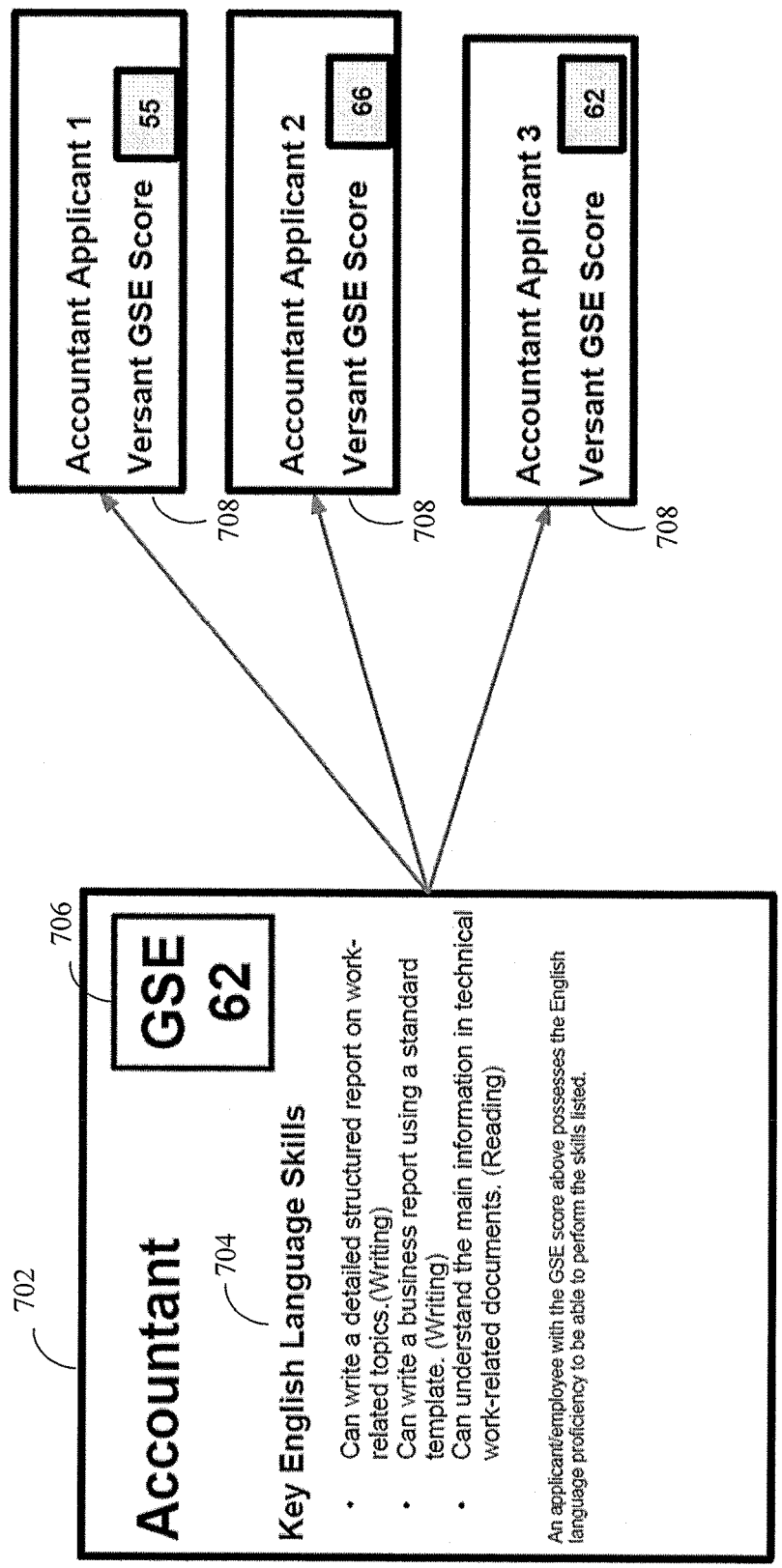
FIG. 7 is a diagram illustrating a comparison of the Global Scale of English (GSE) scores for a number of potential candidates to a GSE score associated with an integrated job profile.

FIG. 7 illustrates a relationship between the GSE scores for a number of potential candidates to a GSE score associated with an integrated job profile. Integrated job profile 702 includes a number of details of the job profile including key skills and GSE expectations associated with the job profile (in this example, an accountant position). Specifically, integrated job profile 702 includes list 704 of learning objectives that have previously been associated with the job. Typically, list 704 of learning objectives includes a set of learning objectives that, once completed by a particular candidate, would render that candidate potentially qualified for the job profile.

The learning objectives could be associated with integrated job profile 702, for example, by performing an automated or manual analysis of a textual content of a job profile and, based upon that analysis, associating the job profile with a set of learning objectives. In various embodiments, a job profile may be processed according to any of the methods of FIGS. 2-6 to associate the job profile with various learning objectives.

Integrated job profile 702 also depicts a target GSE score 706 for the job profile. GSE score 706 may indicate a GSE score that must be exceeded by a particular candidate before that candidate can be considered for the position. Alternatively, GSE score 706 may depict a GSE score that a typical candidate for the position should have achieved. In various other examples, GSE score 706 could represent a score that an excellent candidate for the position may have achieved.

FIG. 7 also depicts a number of different candidates 708 for the position of the integrated job profile 702. Each candidate 708 has been previously evaluated and is now associated with a particular GSE score. The GSE score for a particular candidate 708, as described herein, may be established using any suitable mechanism. For example, personal GSE scores may be established by testing the candidates or by determining that the candidates have completed particular learning objectives or classes associated with particular learning objectives.

The GSE score of each candidate 708 may be used as a mechanism for determining whether a particular candidate 708 qualifies for or may ultimately be successful in the position associated with the integrated job profile 702. If, for example, GSE score 706 of integrated job profile 702 represents a minimum threshold GSE score that must be exceeded before a candidate will be considered, candidates with GSE scores below 62 (in this example) may automatically be disqualified. In other cases, however, GSE score 706 of integrated job profile 702 may represent a guide indicating that candidates with lower GSE scores may not be strong candidates, or may have to make up for the lower GSE score by presenting other skills and attributes that make them stronger candidates.

In this manner, the GSE score associated with integrated job profile 702 can be a useful guide for candidates and recruiters in determining whether a particular candidate is well suited to a position described by a particular job profile.

Figure 8:
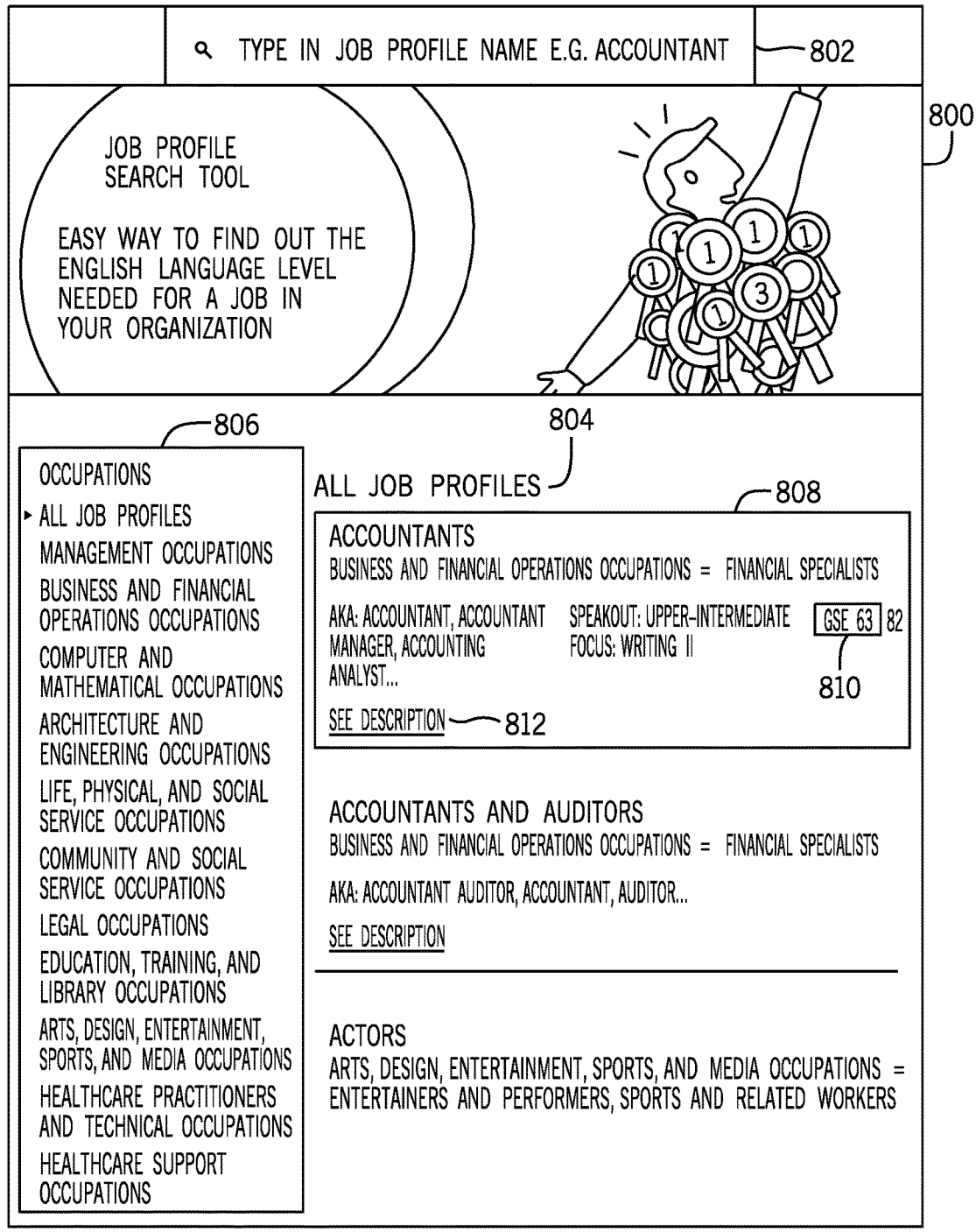
FIG. 8 is a screenshot of a user interface enabling a user to search through a number of job profiles and review GSE scores associated with those job profiles.

FIG. 8, for example, shows user interface 800 enabling a user to search through a number of integrated job profiles and review GSE scores associated with those integrated job profiles. User interface 800 may be displayed by any suitable computing device, such as a desktop or tablet computer, smartphone or other mobile device, and the like. User interface 800 may be displayed via a website hosted by a computer server operated by, for example, an entity that maintains a database of job profiles.

User interface 800 provides a number of mechanisms by which a user can search for and identify a particular integrated job profile. For example, a user could enter a keyword search or other type of search into search bar 802. After the keywords are entered and the search is executed, a listing of job profiles 804 matching the search keywords can be displayed in job profile listing 804.

Alternatively, a user may navigate through a hierarchical listing of available job profiles in sidebar navigation 806. Within sidebar navigation 806, a number of job profiles can be arranged in groupings of related job profiles enabling the user to drill-down through various categories of job profiles in order to identify a desired job profile. Once a desired job profile or category of job profiles is identified, it can be selected by the user and additional information about the job profile or a listing of job profiles falling within the selected category will display in listing of job profiles 804.

Within listing of job profiles 804, each job profile entry may display various details associated with a particular job profile. For example, as shown in FIG. 8, job profile 808 includes a title as well as a description of the category in which the job profile belongs ("Business and Financial Operations Occupations>Financial Specialists"). Job profile 808 is an integrated job profile. Consequently, job profile 808 has previously been analyzed and associated with a particular GSE score 810. GSE score 810 of integrated job profile 808 is displayed within listing of job profiles 804 enabling a user to quickly identify GSE score 810 associated with integrated job profile 808. As such, a user using user interface 800 to search for and browse details of various job profiles can quickly identify any GSE score requirements that may be associated with a particular job profile.

As such, user interface 800 may be used by a potential candidate who knows his or her own GSE score to search for and identify job profiles for which the candidate may be well qualified. Similarly, a recruiter, searching for appropriate job profiles on behalf of one or more candidates can identify job profiles having GSE requirements suited to the recruiter's candidates.

Figure 9:
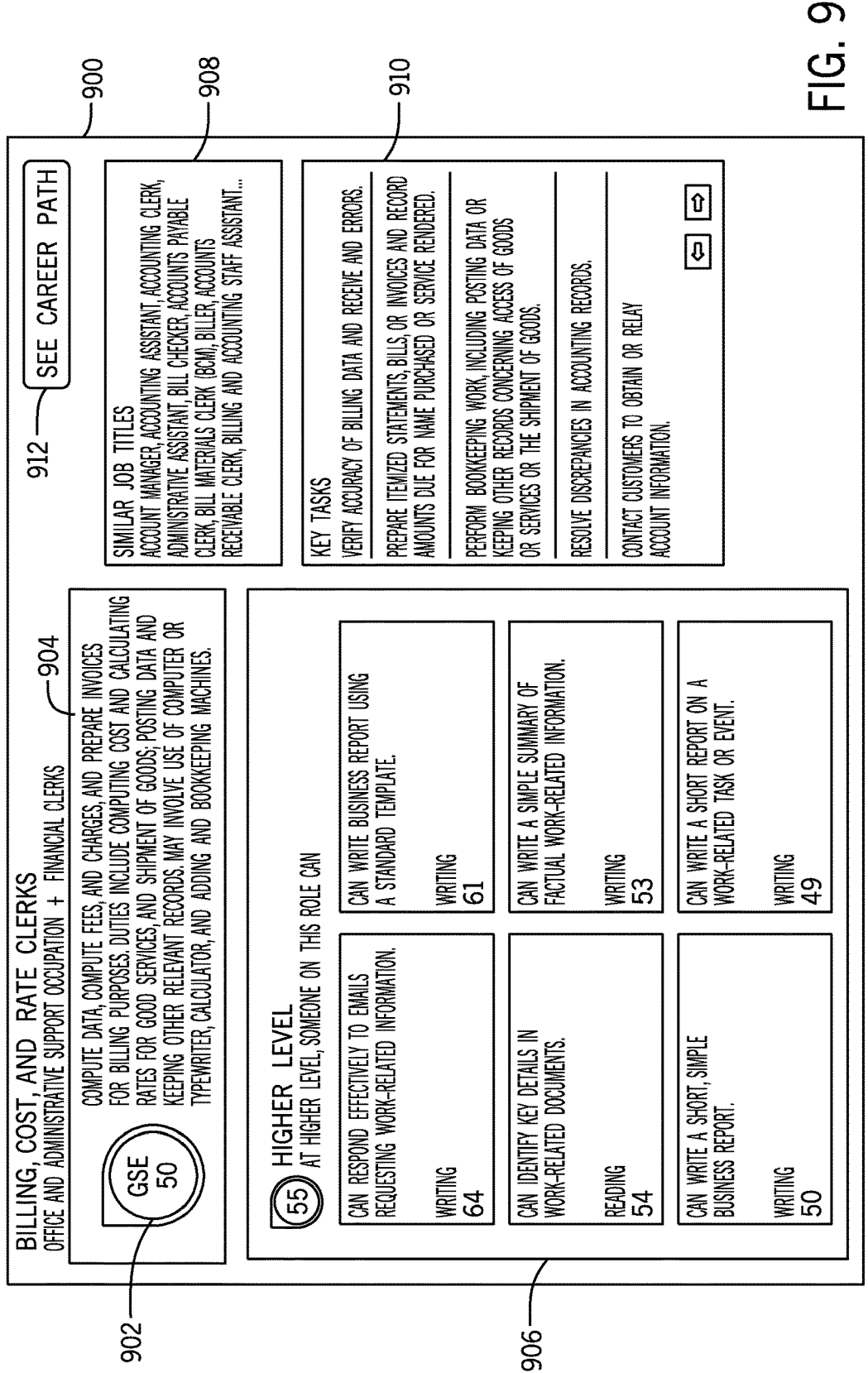
FIG. 9 is a screenshot depicting details of a job profile in which higher-level GSE scores and learning objectives are shown.
Figure 10:
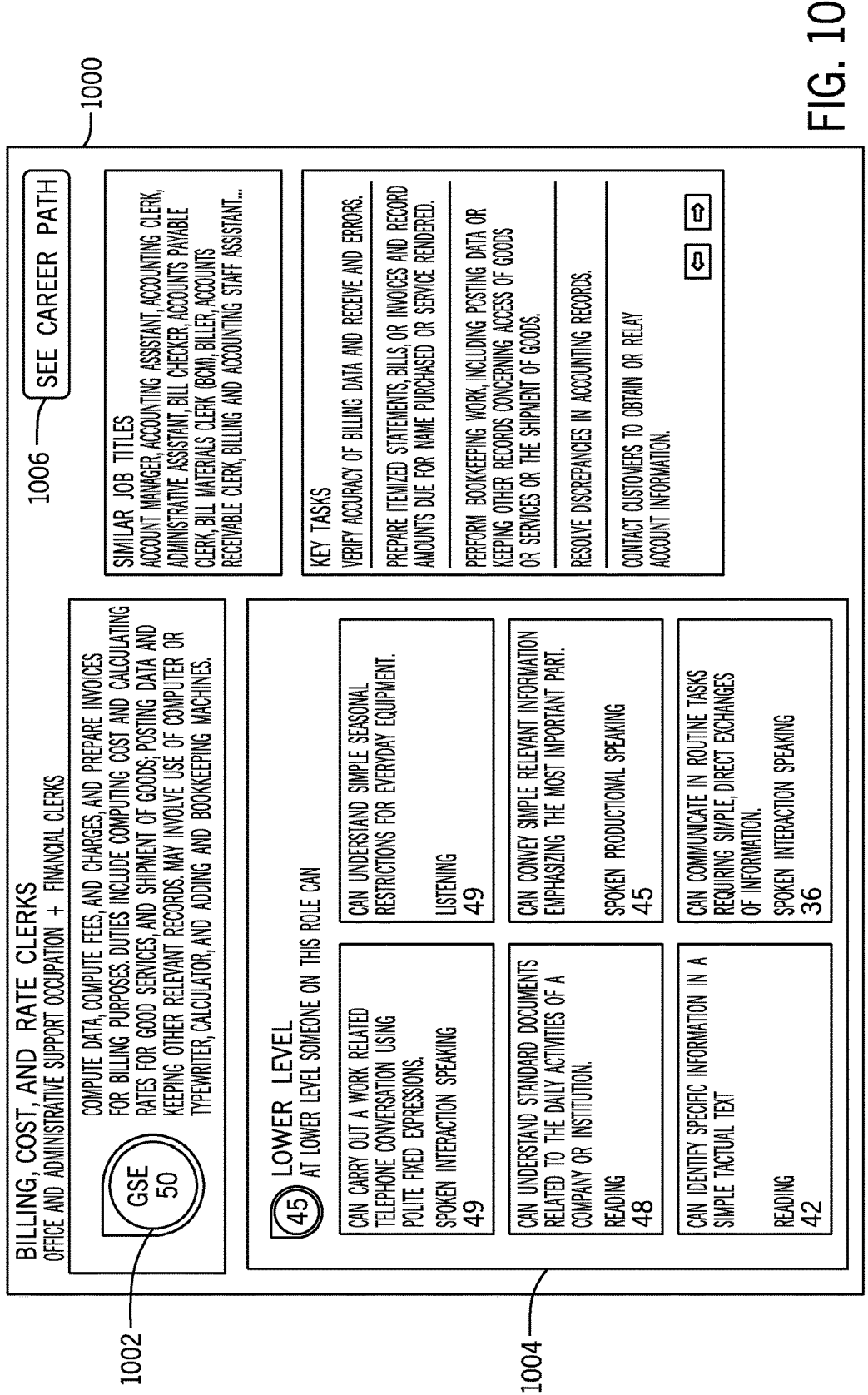
FIG. 10 is a screenshot depicting details of a job profile in which lower-level GSE scores and learning objectives are shown.

In some embodiments, the user, via user interface 800, can select one of the job profiles listed in listing of job profiles 804 in order to learn more about that particular job profile. In one example, the additional detail may be viewed by selecting description link 812. To illustrate, FIGS. 9 and 10 depict screenshots showing additional detail for a particular integrated job profile. FIG. 9 shows additional detail of a job profile in which higher-level GSE scores and learning objectives are shown, while FIG. 10 shows a similar detail view of a job profile, but with lower-level GSE scores and learning objectives.

In FIG. 9, detailed view 900 includes a depiction of general GSE score 902 for the integrated job profile as well as a description of tasks or skills that may be associated with the integrated job profile. As described below, GSE score 902 of detailed view 900 shows the GSE score based upon a collection of high-level learning objectives that have previously been associated with the integrated job profile. The listing of tasks or skills may be associated with an original job profile, or may, in some embodiments, be derived from the learning objectives that have previously been associated with the integrated job profile.

Detailed view 900 also lists a number of learning objectives 906 that have previously been associated with the integrated job profile. As described earlier, the tasks of a particular job profile may be associated with different sets of learning objectives, where a first set of learning objectives may be associated with a first level of competency for the job profile and a second set of learning objectives may be associated with a different level of competency for the job profile. In this manner, a set of "high-level" learning objectives and corresponding GSE scores could be associated with a particular job profile. In that case, a candidate that has met those learning objectives or has a personal GSE score that meets or exceeds the combined score (e.g., average GSE score) for each of the high-level learning objectives may represent an excellent, highly qualified candidate for the job profile.

Additionally or alternatively, a set of low-level learning objectives and corresponding GSE scores could be associated with a particular job profile. The low-level learning objectives and GSE scores may represent a minimum set of learning objectives or minimum GSE score that must be achieved before a candidate may even be considered qualified for a particular job profile. In that case, a candidate that has met the low-level learning objectives or has a personal GSE score that meets or exceeds the combined score (e.g., average GSE score) for each of the low-level learning objectives may merely meet a lowest threshold for being qualified for the job profile.

In FIG. 9, a set of high-level learning objectives for the job profile is depicted. Each learning objective is shown with an associated GSE score as well as a brief description of the learning objective. Additionally, the functional skill associated with each learning objective is shown in detailed view 900. If the user wishes to learn more about one of the learning objectives 906 the user can select one of the learning objectives 906. The user interface could then provide the user not only with information about the selected learning objective, but access to resource enabling the user to take classes or review instructional material meeting the selected learning objective.

Detailed view 900 shows additional information for the job profile, such as listing of similar job titles 908. The job profiles that are contained within listing of similar job titles 908 may include hyperlinks to other job profiles that are similar to the job profile currently being viewed. Similar job profiles can be identified by any suitable approach, including keyword comparisons of the descriptions of the job profiles, as well as comparison of the learning objectives that have been associated with the other job profiles. In some cases, the job profiles included within the listing of similar job titles 908 may only include integrated job profiles having GSE scores that are within a threshold amount (e.g., 5% or 10%) of the GSE score of the integrated job profile currently being viewed within detailed view 900. Detailed view 900 may also include a summary of tasks 910 associated with the integrated job profile currently being viewed.

FIG. 10 shows additional detail of a job profile in which lower-level GSE scores and learning objectives are depicted. Detailed view 1000 shown in FIG. 10 is similar to that illustrated in FIG. 9, but, in FIG. 10, GSE score 1002 has been derived from a set of lower-level learning objectives that have previously been associated with the integrated job profile. Similarly, detailed view 1000 lists a number of lower-level learning objectives 1004 that have previously been associated with the integrated job profile. Each learning objective is shown with an associated GSE score as well as a brief description of the learning objective. Additionally, the functional skill associated with each learning objective is shown in detailed view 1000. If the user wishes to learn more about one of the learning objectives 1004 the user can select one of the learning objectives. The user interface could then provide the user not only with information about the learning objective, but access to resource enabling the user to take classes or review instructional material meeting the selected learning objective.

The user interfaces illustrated in FIGS. 8-10 allow users (e.g., job candidates, recruiters, human resources staff, and the like) to search for and filter job profiles based upon GSE scores. Using these systems a candidate can quickly identify job profiles that, based upon the candidate's own GSE score, match the candidate well.

Figure 11:
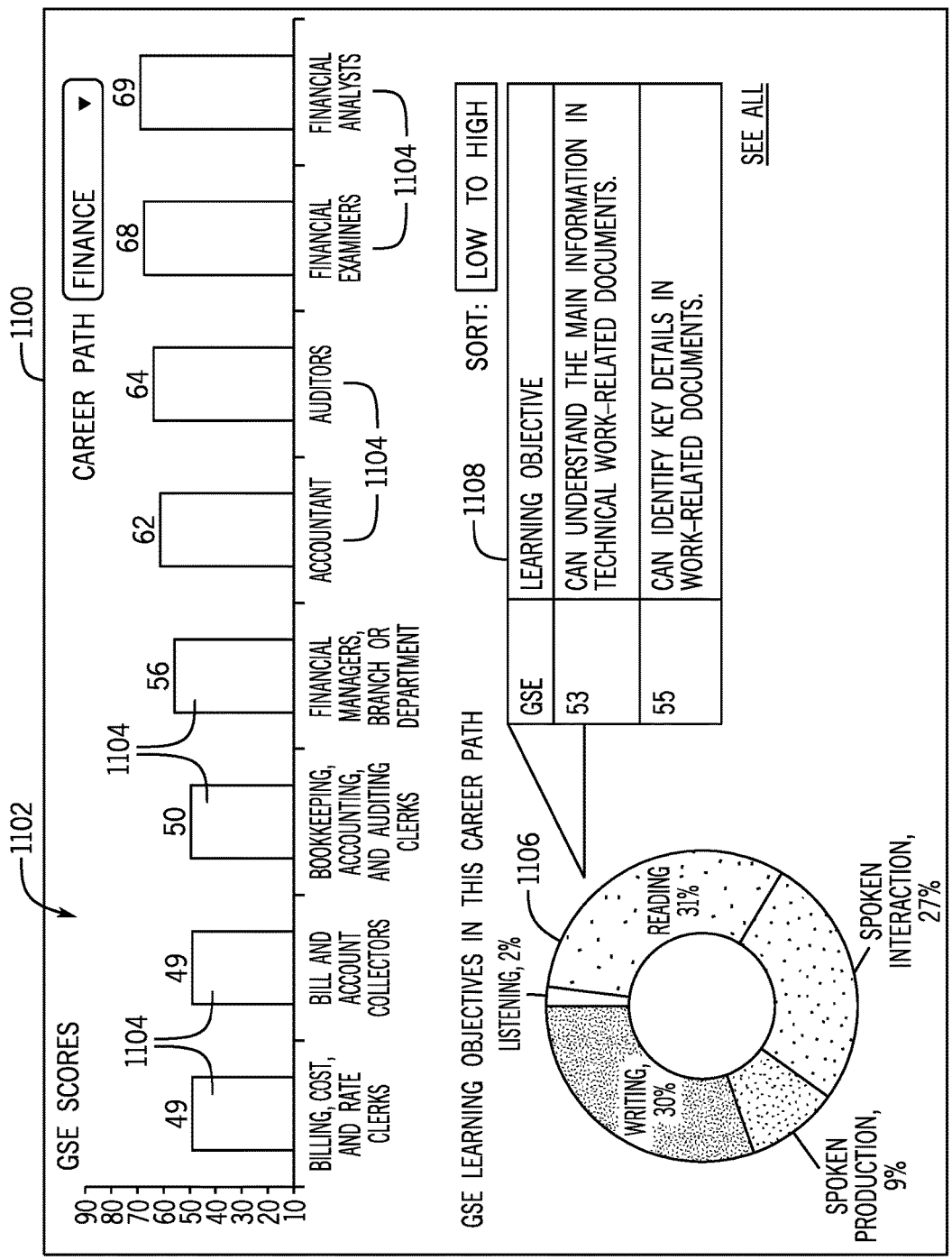
FIG. 11 is a screenshot depicting a potential career path and GSE learning objectives associated with steps in the career path.

In addition to providing for the analysis of a single integrated job profile, the present system can enable a user to browse through and review a number of job profiles that are all grouped together within a particular career path. FIG. 11, for example, shows user interface 1100 depicting a potential career path 1102 including a number of different job profiles 1104 within that career path 1102. User interface 1100 may be accessed, for example, using the "see career path" buttons 912 and 1006 of FIGS. 9 and 10, respectively. When either of "see career path" buttons 912 or 1006 are executed, a career path associated with the job profile currently being viewed is identified. This may involve retrieving, for example, a career path notation that is stored in associated with the job profile, or automatically determining a career path for the job profile (e.g., based upon a textual analysis of the contents of the job profile). Once a particular career path is identified, a number of other job profiles belonging to the same career path can be identified.

A number of job profiles may be grouped together into a career path, as described herein, in any suitable manner. In some cases, a database (e.g., hosted by an entity that maintains records associated with each of the job profiles) may store one or more linked lists associating a number of different job profiles together in an ordered list. A single ordered list of job profiles may then be associated with a particular career path. In other cases, a group of job profiles may simply be associated with (e.g., tagged) with a particular career descriptor (e.g., finance or marketing). Job profiles that share the same career descriptor can then be associated into a particular career based upon that descriptor.

Within user interface 1100, each job profile 1104 of the career path is associated with a GSE score. Job profiles 1104 are arranged as in a bar graph, where the height of each bar associated with job profiles 1104 represents the GSE score associated with each job profile 1104. In other embodiments, any suitable approach may be used to depict a set of related job profiles, where that depiction may or may not include a depiction or representation of the GSE scores associated with each job profile.

In the case that job profiles are grouped together into a career path by means of a descriptor, such an approach does not provide information describing the order in which the job profiles would tend to occur within that career. In that case (and with reference to FIG. 11), the job profiles could simply be sorted in order of ascending GSE score associated with the job profiles. In that case, job profiles with lower GSE scores would be depicted earlier within the career path 1102 than other job profiles having higher associated GSE scores.

User interface 1100 also shows a summary 1106 of learning objectives associated with the career path. The depicted summary 1106 may be determined, for example, by first identifying the learning objectives that have previously been associated with the job profiles of the career path. When all learning objectives for all job profiles 1104 in the career path have been identified, a statistical breakdown of the learning objectives (e.g., what percentage the learning objectives fall into each of the functional skills categories) can be calculated and depicted. If the user wishes to see more information regarding the summary 1106 of learning objectives, the user can, for example, click on one of the functional skills categories (e.g., reading) to see summary 1108, which depicts information describing the learning objectives that fall within the selected functional skills category.

By reviewing the career path depiction of user interface 1100 a user, aware of his or her GSE score, can begin to make longer term career plans. If the user should wish to move into a new position associated with a new job profile, the user can review the GSE score requirements for that new position and begin planning how to complete the necessary learning objectives in order to meet the GSE requirements for that new position. The user can also see how completing new learning objectives may enable the user to pursue new career opportunities, possibly resulting in increased income or employment stability.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, cloudDNA®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The present systems can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

What is claimed is:

1. A talent management system (TMS) of a company, comprising:
    a first network database implemented on a database server comprising a plurality of learning objectives belonging to a framework for measuring English proficiency, each of the learning objectives being associated with a corresponding score;
    a second network database implemented on a database server containing data used by the (TMS): and
    a server communicatively coupled to and configured to access the first network database and the second network database, the server comprising device logic and a processor that executes the device logic to:
        receive job profile data representing a job profile describing an occupation, the job profile data including a plurality of tasks that an individual holding the occupation must be able to complete,
        generate an integrated job profile data structure representing the job profile integrated with the framework,
        identify one or more of the plurality of learning objectives in the first network database as being required to complete one or more of the plurality of tasks;
        associate, in the integrated job profile data structure, the one or more learning objectives with each of the plurality of tasks that requires the corresponding learning objective,
        calculate an overall score from at least the associated scores of the one or more learning objective,
        store the overall score in the integrated job profile data structure, and store the integrated job profile data structure in the second network database: and
    a user interface configured to match a user with the integrated job profile based on the overall score.

2. The talent management system of claim 1, wherein the processor further executes the device logic to:
    connect to a user device over a computer network;
    send, to the user device, the user interface including a first task of the plurality of tasks and a first learning objective of the plurality of learning objectives, the user device displaying the user interface to the user;
    receive from the user device a user input comprising a selection of the first learning objective; and
    associate the first learning objective with the first task.

3. The talent management system of claim 1, wherein the processor further executes the device logic to:
    receive training data representing a plurality of pre-integrated job profiles, the training data comprising a plurality of integrated tasks each associated with one or more of the plurality of learning objectives;
    determine that a first task of the plurality of tasks is similar to one or more similar tasks of the plurality of integrated tasks;
    determine that one or more of the one or more similar tasks is associated with a first learning objective of the plurality of learning objectives; and
    associate the first learning objective with the first task.

4. The talent management system of claim 1, wherein the processor further executes the device logic to:
    analyze the job profile data to obtain a plurality of keywords;
    identify at least one first keyword of the plurality of keywords as being obtained from a first task of the plurality of tasks;
    determine that a first learning objective of the plurality of learning objectives is associated with the at least one first keyword; and
    associate the first learning objective with the first task.

5. The talent management system of claim 1, wherein the processor further executes the device logic to:
    identify the occupation from the job profile data;
    obtain one or more employee records each associated with an employee that held the occupation;
    determine an English proficiency score of each employee from the corresponding employee record of the one or more employee records; and calculate the overall score from the English proficiency score of each employee associated with one of the one or more employee records.

6. A talent management system (TMS), comprising an electronic platform, in electronic communication with a first network database implemented on a database server and comprising device logic and a processor that executes the device logic to:
receive job profile data representing a job profile describing an occupation, the job profile data including a plurality of tasks that an individual holding the occupation must be able to complete;
generate an integrated job profile data structure representing the job profile integrated with a framework for measuring English proficiency, the framework having a scale of scores; determine that a first plurality of the scores is associated with the occupation; calculate an overall score from at least the first plurality of scores; store the overall score in the integrated job profile data structure; and store the integrated job profile data structure in the first network database: and match a user with the integrated job profile based on the overall score.

7. The TMS of claim 6, wherein the TMS is communicatively coupled to and configured to access a plurality of network databases including the first network database, at least one of the plurality of network databases storing a plurality of learning objectives belonging to the framework, each of the learning objectives being associated with a corresponding score in the scale.

8. The TMS of claim 7, wherein to determine that the first plurality of scores is associated with the occupation, the processor executes the device logic to:
identify a first learning objective of the plurality of learning objectives as being required to complete a first task of the plurality of tasks; and
associate, in the integrated job profile data structure, the first learning objective with each of the plurality of tasks that requires the corresponding learning objective.

9. The TMS of claim 6, wherein to determine that the first plurality of scores is associated with the occupation, the processor further executes the device logic to:
connect to a user device over a computer network;
send, to the user device, a user interface including a first task of the plurality of tasks and a plurality of learning objectives belonging to the framework, the user device displaying the user interface to the user;
receive from the user device a user input comprising a selection of the plurality of learning objectives; and
determine that the first plurality of scores is associated with the plurality of learning objectives.

10. The TMS of claim 6, wherein to determine that the first plurality of scores is associated with the occupation, the processor further executes the device logic to:
receive training data representing a plurality of pre-integrated job profiles, the training data comprising a plurality of integrated tasks each associated with a corresponding plurality of learning objectives belonging to the framework;
determine that a first task of the plurality of tasks is similar to a second task of the plurality of integrated tasks;
determine that the second task is associated with a first plurality of the learning objectives; and
determine that the first plurality of scores is associated with the first plurality of learning objectives.

11. The TMS of claim 6, wherein to determine that the first plurality of scores is associated with the occupation, the processor further executes the device logic to:
analyze the job profile data to obtain a plurality of keywords;
identify at least one first keyword of the plurality of keywords as being obtained from a first task of the plurality of tasks;
determine that a plurality of learning objectives belonging to the framework is associated with the at least one first keyword; and
determine that the first plurality of scores is associated with the plurality of learning objectives.

12. The TMS of claim 6, wherein to determine that the first plurality of scores is associated with the occupation, the processor further executes the device logic to:
identify the occupation from the job profile data;
obtain one or more employee records each associated with an employee that held the occupation;
determine an English proficiency score of each employee from the corresponding employee record of the one or more employee records; and
determine that the first plurality of scores includes the determined English proficiency scores.

13. A computer-implemented method for integrating a job profile describing an occupation into an electronic talent management system (TMS), the method comprising:
receiving, from an electronic network databases implemented on a database server, job profile data representing the job profile, the job profile data including a plurality of tasks that an individual holding the occupation must be able to complete;
generating an integrated job profile data structure representing a first integrated job profile of a plurality of integrated job profiles, wherein the first integrated job profile is the job profile integrated with a framework for measuring English proficiency;
determining that a first task of the plurality of tasks requires the individual to fulfill a first learning objective of a plurality of learning objectives each having an associated score that measures English proficiency;
associating the first task with the first learning objective in the integrated job profile data structure;
determining that a second task of the plurality of tasks requires the individual to fulfill a second learning objective of the plurality of learning objectives;
associating the second task with the second learning objective in the integrated job profile data structure;
calculating an overall score from at least the associated scores of the first and second learning objectives;
storing the overall score in the integrated job profile data structure; and storing the integrated job profile data structure in a network database implemented on a database server of the TMS; and
matching a user using a user interface with the integrated job profile based on the overall score.

14. The method of claim 13, wherein the job profile data further includes an occupation parameter identifying the occupation, the method further comprising storing the job profile data in the integrated job profile data structure.

15. The method of claim 13, further comprising connecting to a user device over a computer network;
wherein determining that the first task requires the individual to fulfill the first learning objective comprises:
sending a user interface including the first task and the first learning objective to the user device, the user device displaying the user interface to the user; and receiving from the user device a user input comprising a selection of the first learning objective.

16. The method of claim 13, further comprising receiving training data representing one or more of the plurality of integrated job profiles, the training data comprising a plurality of integrated tasks each associated with one or more of the plurality of learning objectives;
  wherein determining that the first task requires the individual to fulfill the first learning objective comprises:
    determining that the first task is similar to one or more similar tasks of the plurality of integrated tasks; and
    determining that one or more of the one or more similar tasks is associated with the first learning objective.

17. The method of claim 13, further comprising analyzing the job profile data to obtain a plurality of keywords;
  wherein determining that the first task requires the individual to fulfill the first learning objective comprises:
    identifying at least one first keyword of the plurality of keywords as being obtained from the first task; and
    determining that the first learning objective is associated with the at least one first keyword.

18. The method of claim 17, wherein determining that the first learning objective is associated with the at least one first keyword comprises:
  identifying a term associated with the first learning objective, the term selected from an ontology; and
  determining that at least one of the at least one first keyword is associated with the term.

19. The method of claim 13, further comprising:
  identifying the occupation from the job profile data;
  obtaining one or more employee records each associated with an employee that held the occupation; and
  determining an English proficiency score of each employee from the corresponding employee record of the one or more employee records;
  wherein the overall score is further calculated from the English proficiency score of each employee associated with one of the one or more employee records.

20. The method of claim 19, wherein calculating the overall score from the English proficiency score of each employee associated with one of the one or more employee records comprises using the corresponding English proficiency score to validate the overall score calculated from the corresponding scores of at least the first learning objective and the second learning objective.

* * * * *